United States Patent
Kobayashi

(10) Patent No.: US 6,611,557 B1
(45) Date of Patent: Aug. 26, 2003

(54) SERIAL DATA RECEIVER

(75) Inventor: Masaki Kobayashi, Sagamihara (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/334,612

(22) Filed: Jun. 17, 1999

(30) Foreign Application Priority Data

Jun. 30, 1998 (JP) ............................................. 10-184608

(51) Int. Cl.[7] .............................................. H04L 27/38
(52) U.S. Cl. ...................................... 375/225; 375/253
(58) Field of Search ............................... 375/225, 316, 375/340, 222, 35, 360, 369, 370, 377, 363, 344, 365, 366, 228, 368, 364, 362, 354, 253, 465, 468; 370/252, 253, 465, 468, 231, 320, 335, 342, 441; 341/59, 61

(56) References Cited

U.S. PATENT DOCUMENTS

| | | | | |
|---|---|---|---|---|
| 5,126,738 A | * | 6/1992 | Sasaki ........................ 311/67 |
| 5,787,132 A | * | 7/1998 | Kishigami et al. ........... 375/354 |
| 5,878,079 A | * | 3/1999 | Mori .......................... 375/225 |
| 5,978,414 A | * | 11/1999 | Nara ........................... 375/225 |
| 5,982,837 A | * | 11/1999 | Earnest ...................... 375/377 |
| 6,141,353 A | * | 10/2000 | Li .............................. 370/465 |
| 6,275,552 B1 | * | 8/2001 | Ando .......................... 375/368 |
| 6,373,827 B1 | * | 4/2002 | Tayebi et al. ............... 370/310 |

* cited by examiner

Primary Examiner—Chi Pham
Assistant Examiner—Dung X. Nguyen

(57) ABSTRACT

A serial data receiver receives a serial data including first data defined as a judgment data indicative of at least one of a data reception rate and a reception data length. A shift register receives the serial data. The first data of the serial data received by the shift register is decoded by a decoder. The decoded result of the decoder is stored in a state register. A control circuit determines at least one of a data reception rate and a reception data length for the reception of the second and subsequent data of the serial data by the shift register based on the decoded result stored in the state register.

3 Claims, 4 Drawing Sheets

FIG. 3

| 1 | 11111111 |
|---|---|
| 2 | DATA 1 |
| 3 | DATA 2 |
| 4 | DATA 3 |
| 5 | DATA 4 |
| 6 | DATA 5 |
| 7 | DATA 6 |
| 8 | DATA 7 |
| 9 | DATA 8 |
| ...... | |
| 256 | DATA 255 |

TRANSMISSION FREQUENCY Ta

| 1 | 00000000 |
|---|---|
| 2 | DATA 1 |
| 3 | DATA 2 |
| 4 | DATA 3 |
| 5 | DATA 4 |
| 6 | DATA 5 |
| 7 | DATA 6 |
| 8 | DATA 7 |
| 9 | DATA 8 |
| ...... | |
| 256 | DATA 255 |

TRANSMISSION FREQUENCY Tb

| 1 | 10101010 |
|---|---|
| 2 | DATA 1 |
| 3 | DATA 2 |
| 4 | DATA 3 |
| 5 | DATA 4 |
| 6 | DATA 5 |
| 7 | DATA 6 |
| 8 | DATA 7 |
| 9 | DATA 8 |
| ...... | |
| 256 | DATA 255 |

TRANSMISSION FREQUENCY Tc

| 1 | 01010101 |
|---|---|
| 2 | DATA 1 |
| 3 | DATA 2 |
| 4 | DATA 3 |
| 5 | DATA 4 |
| 6 | DATA 5 |
| 7 | DATA 6 |
| 8 | DATA 7 |
| 9 | DATA 8 |
| ...... | |
| 256 | DATA 255 |

TRANSMISSION FREQUENCY Td

SERIAL DATA RECEIVER

BACKGROUND OF THE INVENTION

The present invention generally relates to a serial data receiver used in the transmission/reception of serial data.

FIG. 1 is a block diagram showing an arrangement of a conventional serial data receiver. The serial data receiver is mounted in a master device 401. A serial port ROM 402 as a slave device is connected to a data terminal 403 and a clock terminal 404, both of which are provided in the master device 401, via a data wiring line 405 and a clock wiring line 406. A frequency divider 407 provided in the master device 401 generates a clock and supplies the generated clock to respective circuits including a shift register 408 in the master device 401. The frequency divider 407 also supplies the generated clock from the clock terminal 404 to the serial port ROM 402 via the clock wiring line 406. The shift register 408 provided in the master device 401 receives a serial data from the serial port ROM 402 via the data wiring line 405 and data terminal 403. The received serial data is stored in a data register 409. Thereby, the serial data receiving operation is completed. When the received serial data is used in the master device 401, a read signal 410 inputted to a three-state buffer 411 via a data read enable terminal 419 is made to be active. Thereby, the received serial data is outputted from the data register 409 onto a data bus 412 via the three-state buffer 411. The received serial data outputted on the data bus 412 is outputted to the outside via a data bus output terminal 420. A control circuit 413 controls the respective circuits in the master device 401, and controls the serial port ROM 402. The control circuit 413 and the serial port ROM 402 are connected via a line which connects a slave output enable terminal 414 and an output enable terminal 415 of the serial port ROM 402.

A data reception rate in the above-mentioned serial data receiving operation is externally set in the frequency divider 407 through data reception rate setting terminals 416 and 417 provided in the master device 401. A reception data length is externally set in the frequency divider 407 through a reception data length setting terminal 418. In the master device 401, since the two data reception rate setting terminals 416 and 417 are provided, a maximum of four data reception rates can be externally set. Since the single reception data length setting terminal 418 is provided, a maximum of two reception data lengths can be externally set.

In the serial data receiver, however, the setting of the data reception rate and reception data length is carried out externally via the data reception rate setting terminals 416 and 417 and reception data length setting terminal 418, so that the manual setting work is required. For this reason, when a data transmission rate and reception data length of the slave device (the serial port ROM 402) connected to the master device 401 are modified, this involves a problem that a user must again set the data reception rate and reception data length.

Further, when the master device 401 is made in the form of an LSI, several external pins must be provided. In this case, when its cost requirement is severe, this results in one of causes of increasing its costs because it is necessary to increase the chip size, the number of pins and the package size.

Furthermore, there is a case where in order to reduce the number of necessary pins, the data reception rate is fixed according to the specification of the lowest data transmission rate of one among the slave devices which are possibly connected to the serial data receiver. In this case, the performance of the slave device cannot be fully delivered to its maximum level, so that the communication time is prolonged. This undesirably leads to the fact that the process after receiving data is delayed.

SUMMARY OF THE INVENTION

In the present invention, in order to attain the above object, a data reception rate and/or a reception data length when the serial data receiver receives the second and subsequent data of serial data are determined by specifying the first one of serial data as a judgment data and providing judgment means in the conventional serial data receiver. Thereby, it is easily optimized the reception condition of the second and subsequent data of the serial data using the first data thereof as the judgment data. Accordingly, the need for providing a terminal for setting of the reception condition can be eliminated, and the function of a slave device (serial data transmitter) connected to the serial data receiver can be delivered to its maximum level.

A serial data receiver according to a first aspect of the present invention, when receiving serial data, uses a first-received data of the serial data as a judgment data, and determines a data reception rate when receiving second and subsequent data thereof according to a decoded result of the judgment data. Thereby, the serial data receiver can set the data reception rate without providing any data reception rate setting terminal.

A serial data receiver according to a second aspect of the present invention, when receiving serial data, uses a first-received data of the serial data as a judgment data, and determines a reception data length when receiving second and subsequent data thereof according to a decoded result of the judgment data. Thereby, the serial data receiver can set the reception data length without providing any reception data length setting terminal.

A serial data receiver according to a third aspect of the present invention, when receiving serial data, uses a first-received data of the serial data as a judgment data, and determines a data reception rate and a reception data length when receiving second and subsequent data thereof according to a decoded result of the judgment data. Thereby, the serial data receiver can set the receive data rate and reception data length without providing any terminals for setting of the receive data rate and reception data length.

A serial data receiver according to a fourth aspect of the present invention comprises: a shift register for receiving serial data from an outside; a decoder for judging a transmission rate of data first received by the shift register; a state register for storing a judgment result of the decoder; and a control circuit for determining at least one of a reception rate and reception data length for second and subsequent data based on a value stored in the state register. Thereby, the serial data receiver can set the reception rate and/or reception data length without providing any terminals for setting of the reception rate and reception data length.

BRIEF DESCRIPTION OF THE DRAWINGS

FIG. 3 is a diagram showing an example of different data reception rates in the serial data receiver shown in FIG. 2.

DESCRIPTION OF THE PREFERRED EMBODIMENTS

Embodiments of the present invention will be explained in detail with reference to the accompanying drawings.

First Embodiment

Figure 1:
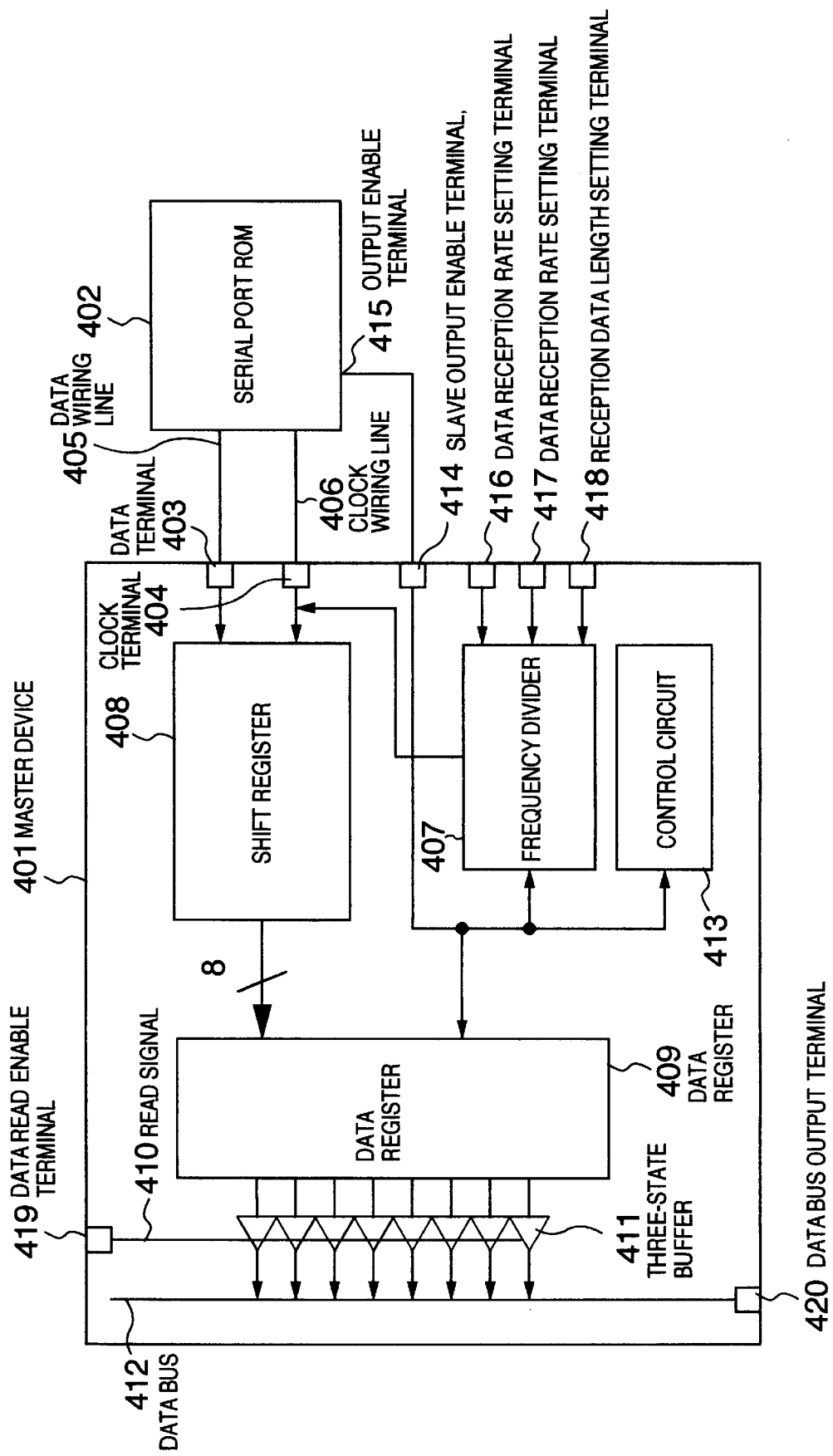
FIG. 1 is a block diagram showing an arrangement of a conventional serial data receiver.
Figure 2:
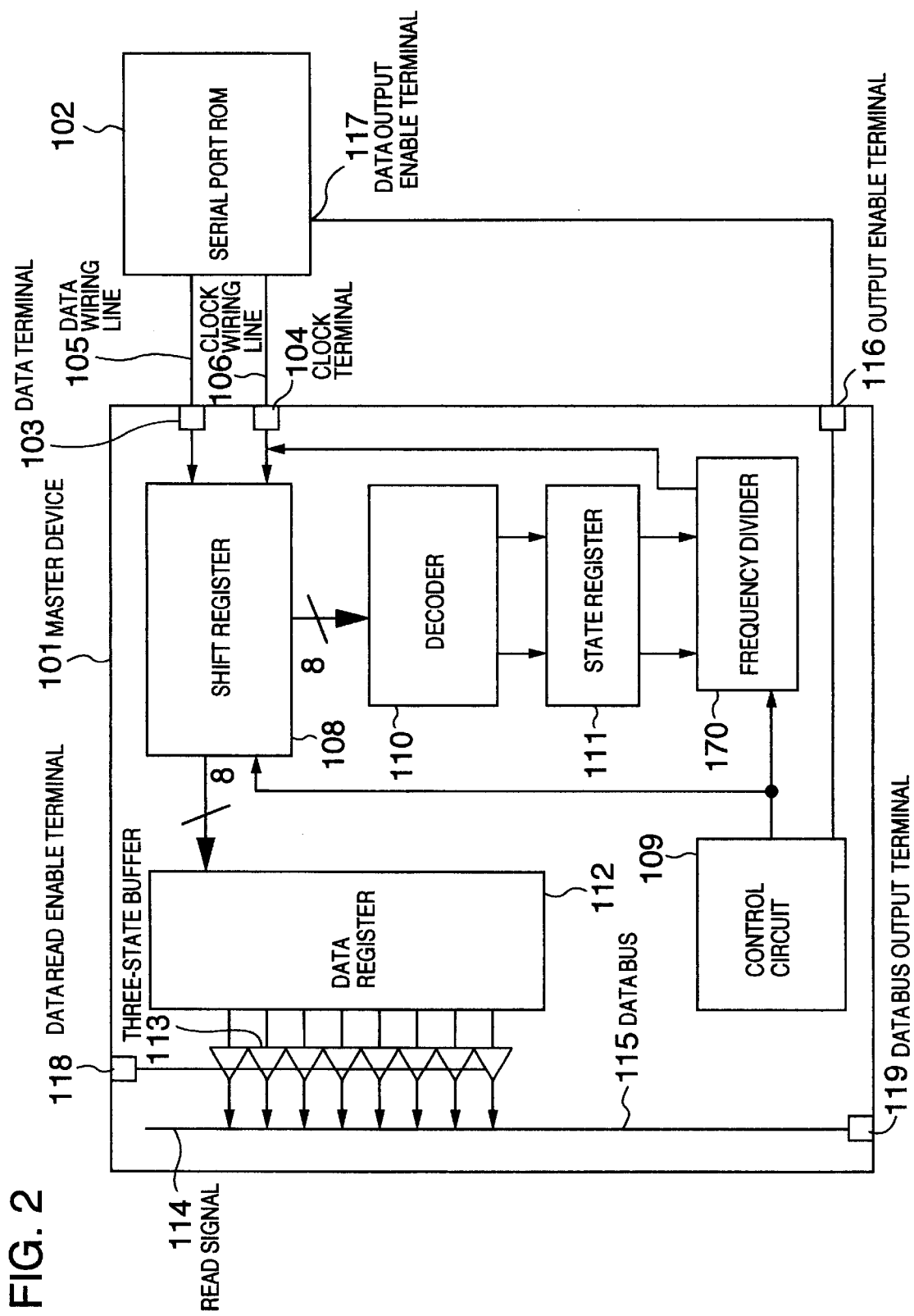
FIG. 2 is a block diagram showing an arrangement of a serial data receiver according to a first embodiment of the present invention.

FIG. 2 is a block diagram showing an arrangement of a serial data receiver according to a first embodiment of the present invention. The serial data receiver is mounted in a master device 101. A serial port ROM 102 as a slave device is connected to a data terminal 103 and a clock terminal 104, both of which are provided in the master device 101, via a data wiring line 105 and a clock wiring line 106. A frequency divider 107 provided in the master device 101 generates a clock, and supplies the generated clock to respective circuits including a shift register 108 in the master device. The frequency divider 107 also supplies the generated clock from the clock terminal 104 to the serial port ROM 102 via the clock wiring line 106. The shift register 108 provided in the master device 101 receives serial data from the serial port ROM 102 via the data wiring line 105 and data terminal 103. A control circuit 109 controls the operation of the serial data receiver. A decoder 110 decodes each of data the serial data received by the shift register 108. A state register 111 stores a decoded result outputted from the decoder 110. A data register 112 stores the serial data received by the shift register 108. When a read signal 114 inputted from the outside via a data read enable terminal 118 is made to be active, a three-state buffer 113 outputs the received serial data stored in the data register 112 onto a data bus 115. The received data on the data bus 115 is outputted to the outside via a data bus output terminal 119. An output enable terminal 116 is connected to a data output enable terminal 117 of the serial port ROM 102.

Explanation will next be made as to the operation of the serial data receiver having such an arrangement when determining a data reception rate thereof. When the master device 101 receives the serial data from the serial port ROM 102, the control circuit 109 puts the data output enable terminal 117 of the serial port ROM 102 in its active state. The frequency divider 107 generates a data reception clock and supplies the clock to the serial port ROM 102. Thereby, the shift register 108 receives the first data of the serial data from the serial port ROM 102. The rate of the clock (i.e. the data reception rate) is set at a rate corresponding to the lowest one of the data transmission rates of the slave devices possibly connected to the master device 101.

The first data of the serial data outputted from the serial port ROM 102 is used as a judgment data by which the master device 101 can identify the data transmission rate (i.e. the transmission frequency) of the serial port ROM 102. In this connection, the judgment data is defined uniquely for the data transmission rates of the slave devices possibly connected to the master device 101. For example, when there are four types of slave devices possibly connected to the master device 101 and when the slave devices have a data length of 8 bits, the judgment data is defined as follows (refer to FIG. 3).

Slave device A with the transmission frequency=Ta (Hz):
Judgment data=11111111;
Slave device B with the transmission frequency=Tb (Hz)
Judgment data=00000000;
Slave device C with the transmission frequency=Tc (Hz):
Judgment data=10101010; and
Slave device D with the transmission frequency=Td (Hz):
Judgment data=01010101;
where Ta<Tb<Tc<Td.

When the shift register 108 receives the first data of the serial data at the reception frequency=Ta (Hz), the received data is decoded by the decoder 110. Thereafter, the decoded result of the decoder 110 is stored in the state register 111 according to a control signal from the control circuit 109. The control circuit 109 controls the frequency divider 107 to change a frequency division ratio based on the value (the decoded result) stored in the state register 111, thereby the new data reception rate (i.e. the reception frequency) is set. The reception of the second and subsequent data of the serial data transmitted from the serial port ROM 102 is carried out at the data reception rate set in the above. For example, when the first data is "11111111", the reception of the second and subsequent data is carried out at the reception frequency (data reception rate)=Ta (Hz). When the first data is "00000000", the reception of the second and subsequent data is carried out at the reception frequency (data reception rate)=Tb (Hz). When the first data is "10101010", the reception of the second and subsequent data is carried out at the reception frequency (data reception rate)=Tc (Hz). When the first data is "01010101", the reception of the second and subsequent data is carried out at the reception frequency (data reception rate)=Td (Hz).

In this way, according to the present embodiment, the serial data receiver can receive the second and subsequent data of the serial data at the data reception rate optimum for the slave device which is transmitting the serial data, without providing any data reception rate setting terminal in the master device 101. For example, it is assumed that each of four slave devices possibly connected to the master device is a serial port ROM having 256 addresses as shown in FIG. 3, and the serial data receiver continuously reads the contents of all the addresses of the single serial port ROM. Then, the reception of data corresponding to one word is carried out at the data reception rate corresponding to the lowest one of the data transmission rates of the four serial port ROMs. However, the reception of data corresponding to the remaining 255 words is carried out at the data reception rate optimum for the serial port ROM which is transmitting the serial data, so that it is possible to shorten the reception time.

Second Embodiment

Explanation will be made as to the operation of the serial data receiver shown in FIG. 2 when determining a reception data length. When the master device 101 receives the serial data from the serial port ROM 102, the control circuit 109 controls the serial port ROM 102 to put the data output enable terminal 117 in its active state. The frequency divider 107 generates the data reception clock, and supplies the clock to the serial port ROM 102. Thereby, the shift register 108 receives the first data of the serial data from the serial port ROM 102. The reception data length is set at a rate corresponding to the shortest one of the data lengths of the slave devices possibly connected to the master device 101.

The first data outputted from the slave device possibly connected to the master device 101 is utilized as a judgment data by which the master device 101 can identify the data length of the slave device. In this case, only several ones of bits of the first data corresponding to the shortest one of the data lengths of the slave devices possibly connected to the master device 101 are used as the judgment data, and the other bits are ignored. The judgment data is uniquely determined for the slave devices possibly connected to the master device 101. For example, when there are two types of slave devices possibly connected to the master device 101 and the slave devices have the data lengths of 8 bits and 16 bits, the judgment-data is defined as follows (refer to FIG. 4).

Slave device E with the data length=8 bits: Judgment data=10101010; and

Slave device F with the data length=16 bits: Judgment data=01010101XXXXXXXX;

The shift register 108 receives only 8 bits in the first data of the serial data, and the decoder 110 decodes the received data. The decoded result is stored in the three-state buffer 113 according to the control signal from the control circuit 109. The control circuit 109 controls the shift register 108 to change the reception data length based on the value (the decoded result) stored in the three-state buffer 113, thereby the new reception data length is set. The reception of the second and subsequent data of the serial data is carried out with the reception data length set in the above. For example, when the received data is "10101010", the reception of the second and subsequent data is carried out with the reception data length=8 bits. When the received data is "01010101", the reception of the second and subsequent data is carried out with the reception data length=16 bits.

Figure 4:
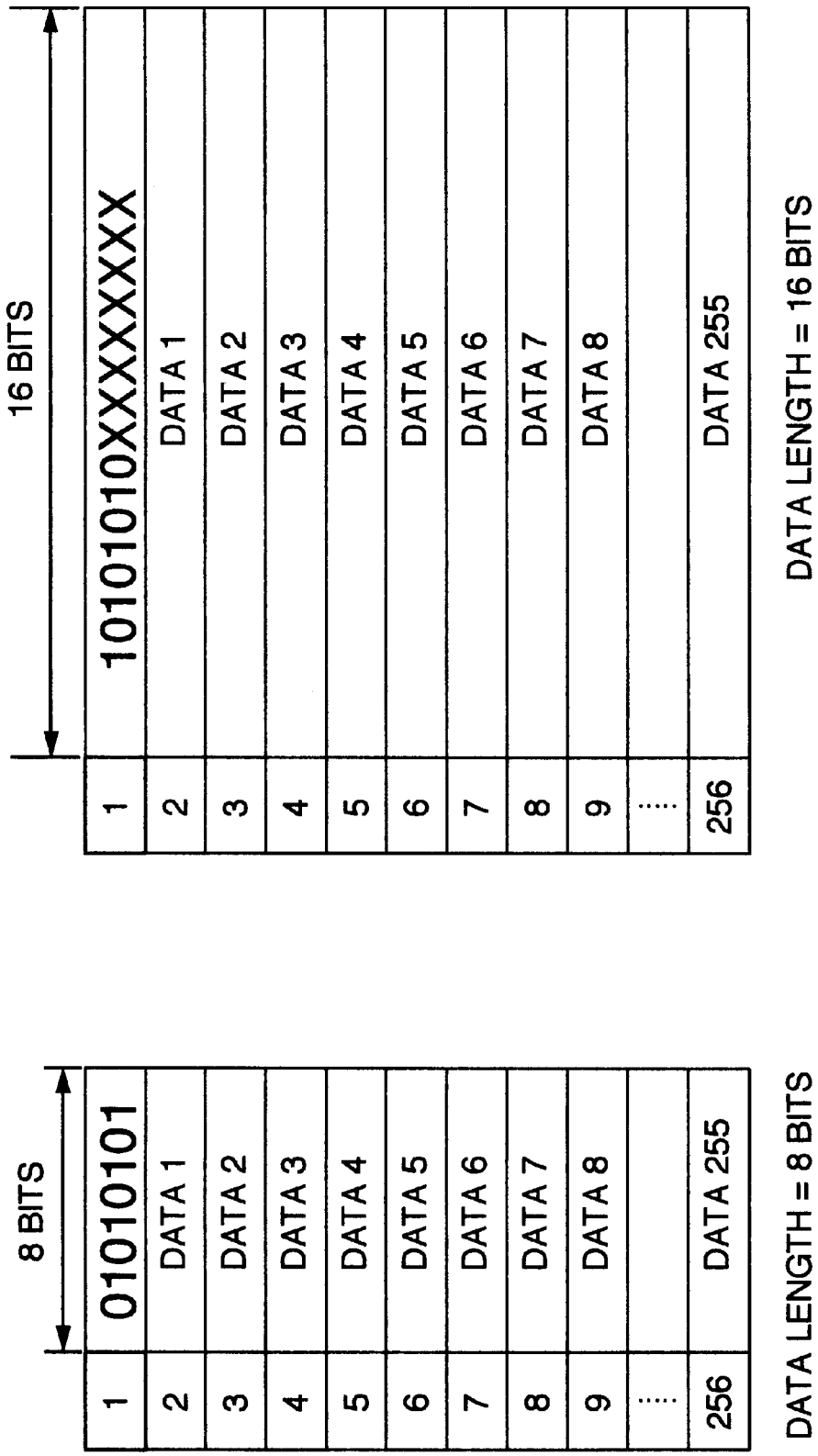
FIG. 4 is a diagram showing an example of different reception data lengths in the serial data receiver shown in FIG. 2.

In this manner, according to the present embodiment, the reception of the second and subsequent data of the serial data can be carried out with the reception data length optimum for the slave device which is transmitted the serial data, without providing any reception data length setting terminal in the master device 101. For example, two types of the slave device such as a serial port ROM with 256 addresses and the 8-bits data length and a serial port ROM with 256 addresses and the 16-bits data length as shown in FIG. 4 can be connected to the master device.

Third Embodiment

In the serial data receiver shown in FIG. 2, when both of the data reception rate and the reception data length are determined, a judgment data is defined as follows.

Slave device G with the data length=8 bits and the transmission frequency=Tg (Hz): Judgment data=11111111;

Slave device H with the data length=8 bits and the transmission frequency=Th (Hz): Judgment data=11111010;

Slave device I with the data length=8 bits and the transmission frequency=Ti (Hz): Judgment data=10101111;

Slave device J with the data length=8 bits and the transmission frequency=Tj (Hz): Judgment data=00001010;

Slave device K with the data length=16 bits and the transmission frequency=Tk (Hz): Judgment data=10100000XXXXXXXX;

Slave device L with the data length=16 bits and the transmission frequency=Tl (Hz): Judgment data=10101010XXXXXXXX;

Slave device M with the data length=16 bits and the transmission frequency=Tm (Hz): Judgment data=01010101XXXXXXXX; and Slave device N with the data length=16 bits and the transmission frequency=Tn (Hz): Judgment data=00000000XXXXXXXX;

where, $Tg<Th<Ti<Tj<Tk<Tj<Tm<Tn$.

When the shift register 108 receives the first data of the serial data at the reception frequency=Tg (Hz), the received data is decoded by the decoder 110. The decoded result is stored in the state register 111 according to the control signal from the control circuit 109. The control circuit 109 controls the frequency divider 107 to change the frequency division ratio based on the value (the decoded result) stored in the state register 111, thereby the data reception rate (i.e. the reception frequency) is set. The control circuit 109 also controls the shift register 108 based on the value stored in the state register 111, thereby the reception data length is set. The reception of the second and subsequent data of the serial data is carried out at the above-set data reception rate and with the above-set reception data length.

For example, when the first received data is "11111111", the reception of the second and subsequent data is carried out at the reception frequency (i.e. the data reception rate)=Tg (Hz) and with the reception data length=8 bits. When the first received data is "11111010", the reception of the second and subsequent data is carried out at the reception frequency (i.e. the data reception rate)=Th (Hz) and with the reception data length=8 bits. When the first received data is "10101111", the reception of the second and subsequent data is carried out at the reception frequency (i.e. the data reception rate)=Ti (Hz) and with the reception data length=8 bits. When the first received data is "00001010", the reception of the second and subsequent data is carried out at the reception frequency (i.e. the data reception rate)=Tj (Hz) and with the reception data length=8 bits.

Further, when the first received data is "10100000", the reception of the second and subsequent data is carried out at the reception frequency (i.e. the data reception rate)=Tk (Hz) and with the reception data length=16 bits. When the first received data is "10101010", the reception of the second and subsequent data is carried out at the reception frequency (i.e. the data reception rate)=Tl (Hz) and with the reception data length=16 bits. When the first received data is "01010101", the reception of the second and subsequent data is carried out at the reception frequency (i.e. the data reception rate)=Tm (Hz) and with the reception data length=16 bits. When the first received data is "00000000", the reception of the second and subsequent data is carried out at the reception frequency (i.e. the data reception rate)=Tn (Hz) and with the reception data length=16 bits.

In this way, according to the present embodiment, since the first data of the serial data is specified as the judgment data, the serial data receiver can receive the second and subsequent data of the serial data at the data reception rate and with the reception data length both of which are optimum for the slave device transmitting the serial data, without providing any data reception rate setting terminal and any the reception data length setting terminals in the master device 101.

As will be clear from the foregoing explanation, in the present invention, the first data of the serial data is defined as the judgment data and the judgment means is provided in the conventional serial data receiver to determine the data reception rate and/or the reception data length for the second and subsequent data of the serial data. Thereby, the present invention can easily optimize the reception of the second and subsequent data using the first data as the judgment data. As a result, the function of the connected serial data transmitter can be brought out without providing any data reception rate setting terminal and/or the reception data length setting terminals.

What is claimed is:

1. A serial data receiver for receiving a serial data, contents of a first data of said serial data being indicative of a reception data length, said receiver comprising:

means for decoding said first data of said serial data to obtain said contents of said first data; and means for determining a reception data length for a reception of second and subsequent data of said serial data based on said contents of said first data obtained by said means for decoding.

2. A serial data receiver for receiving a serial data, contents of a first data of said serial data being indicative of a data reception rate and a reception data length, said receiver comprising:

means for decoding said first data of said serial data to obtain said contents of said first data; and means for determining a data reception rate and reception data length for a reception of second and subsequent data of said serial data based on said contents of said first data obtained by said means for decoding.

3. A serial data receiver for receiving serial data, contents of first data of said serial data being indicative of at least one of a data reception rate and a reception data length, said receiver comprising:

a shift register for receiving said serial data;

a decoder for decoding said first data of said serial data received by said shift register to obtain said contents of said first data;

a state register for storing said contents of said first data obtained by said means for decoding; and a control circuit for determining at least one of a data reception rate and reception data length for a reception of second and subsequent data of said serial data by said shift register based on said contents of said first data obtained by said means for decoding, which are stored in said state register.

* * * * *